Oct. 31, 1967  W. A. SEABURY III  3,349,497
DEVICE FOR COUNTING SHEET LIKE ITEMS
Filed Jan. 13, 1966  4 Sheets-Sheet 1
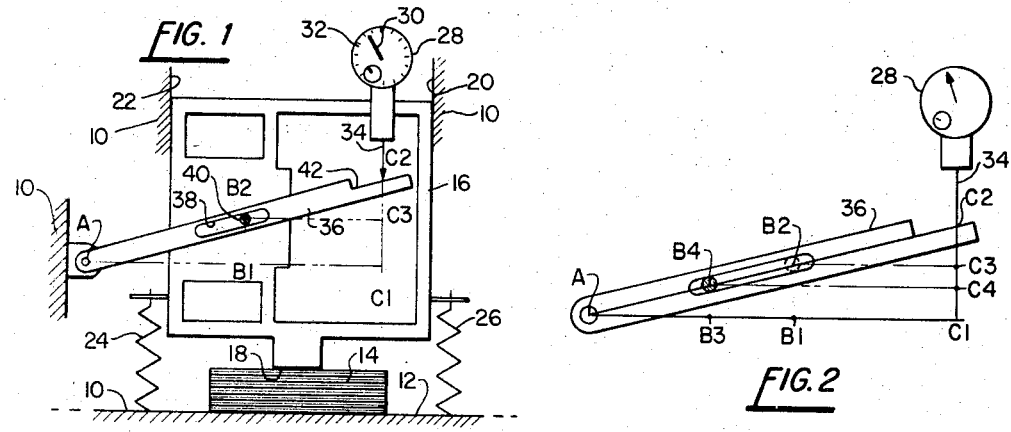
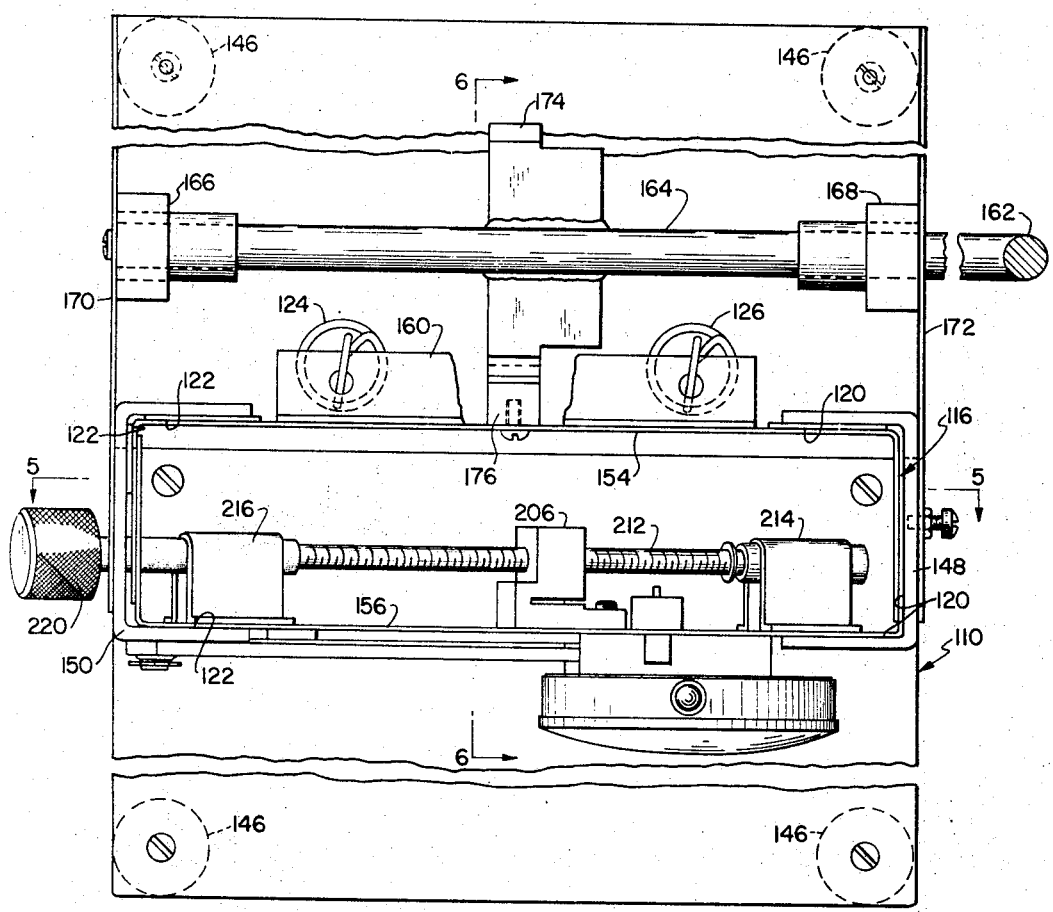
INVENTOR.
WILLIAM A. SEABURY, III
BY
Strauch, Nolan, Neale,
Nies & Bronaugh
ATTORNEYS

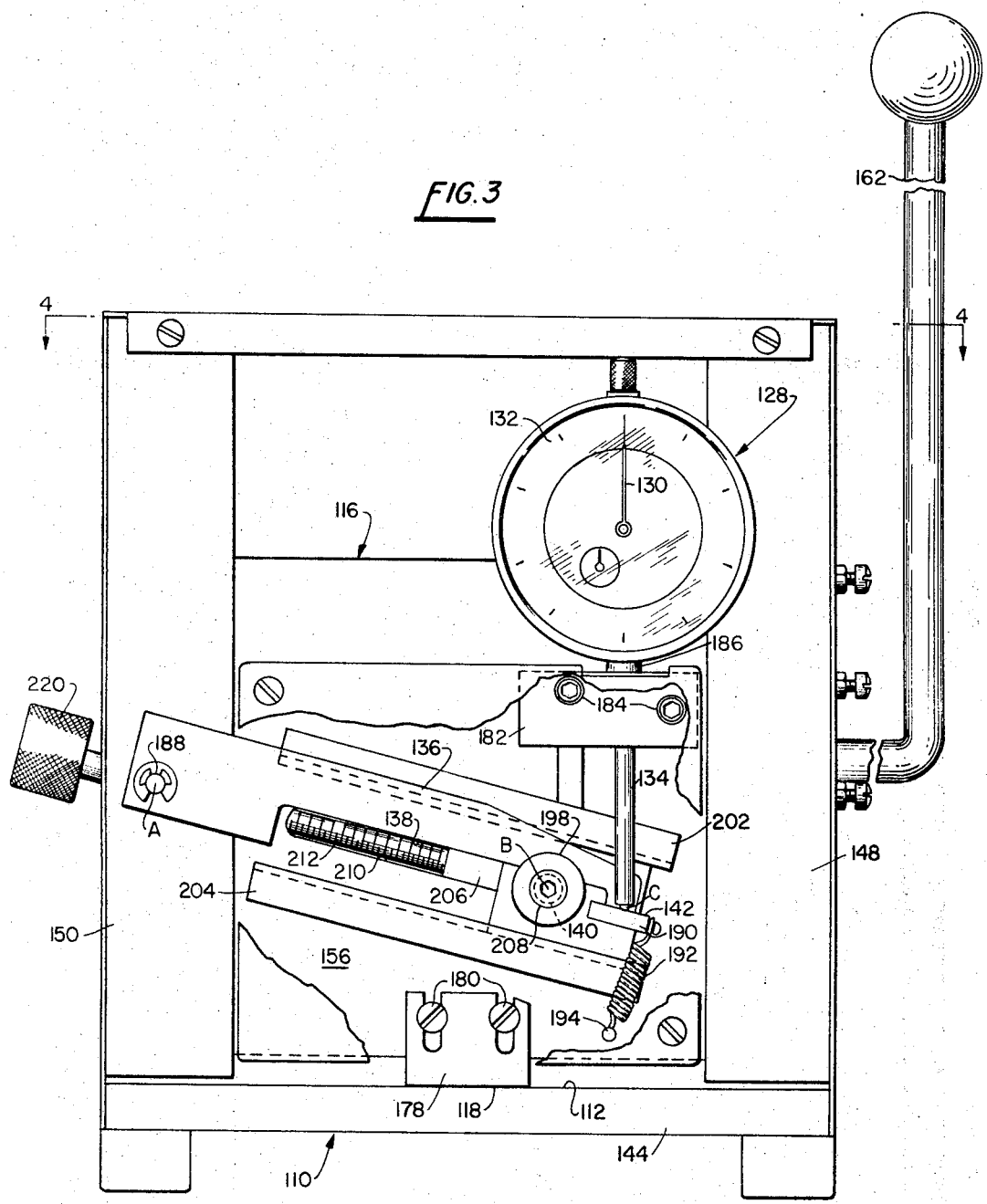

Oct. 31, 1967  W. A. SEABURY III  3,349,497
DEVICE FOR COUNTING SHEET LIKE ITEMS
Filed Jan. 13, 1966  4 Sheets-Sheet 4

INVENTOR.
WILLIAM A. SEABURY, III
BY
Strauch, Nolan, Neale,
Nies & Bronaugh
ATTORNEYS

United States Patent Office 3,349,497
Patented Oct. 31, 1967

3,349,497
DEVICE FOR COUNTING SHEETLIKE ITEMS
William A. Seabury III, Ulster Park, N.Y., assignor to Burton H. Marshall, Ulster Park, N.Y., doing business as Burton H. Marshall Associates
Filed Jan. 13, 1966, Ser. No. 520,532
3 Claims. (Cl. 33—147)

The present invention relates to improvements in devices for counting documents which are of substantially uniform thickness, in bulk rather than individually. Specifically, the present device permits determination of the number of sheets of material or documents such as paper, cardboard and the like which are in a pile or stack by measuring the height of the pile. An important feature of this invention is that the device may be rapidly and accurately adjusted in relation to the thickness of the individual documents so that the number of sheets or documents may be read directly upon a graduated indication or dial regardless of the thickness of the individual documents or sheets.

The objects of this invention will become more fully apparent by reference to the appended claims and as the following detailed description proceeds in reference to the accompanying drawings wherein:

FIGURE 1 is a diagrammatic illustration of the apparatus of the present invention;

FIGURE 2 is a diagram illustrating the adjustment and motion of the critical points of the apparatus of the present invention;

FIGURE 3 is a front elevation, with a portion of one of the front covers removed, of a preferred embodiment of the present invention;

FIGURE 4 is a top plan view of the apparatus of FIGURE 3 with the cover removed;

Figure 5:
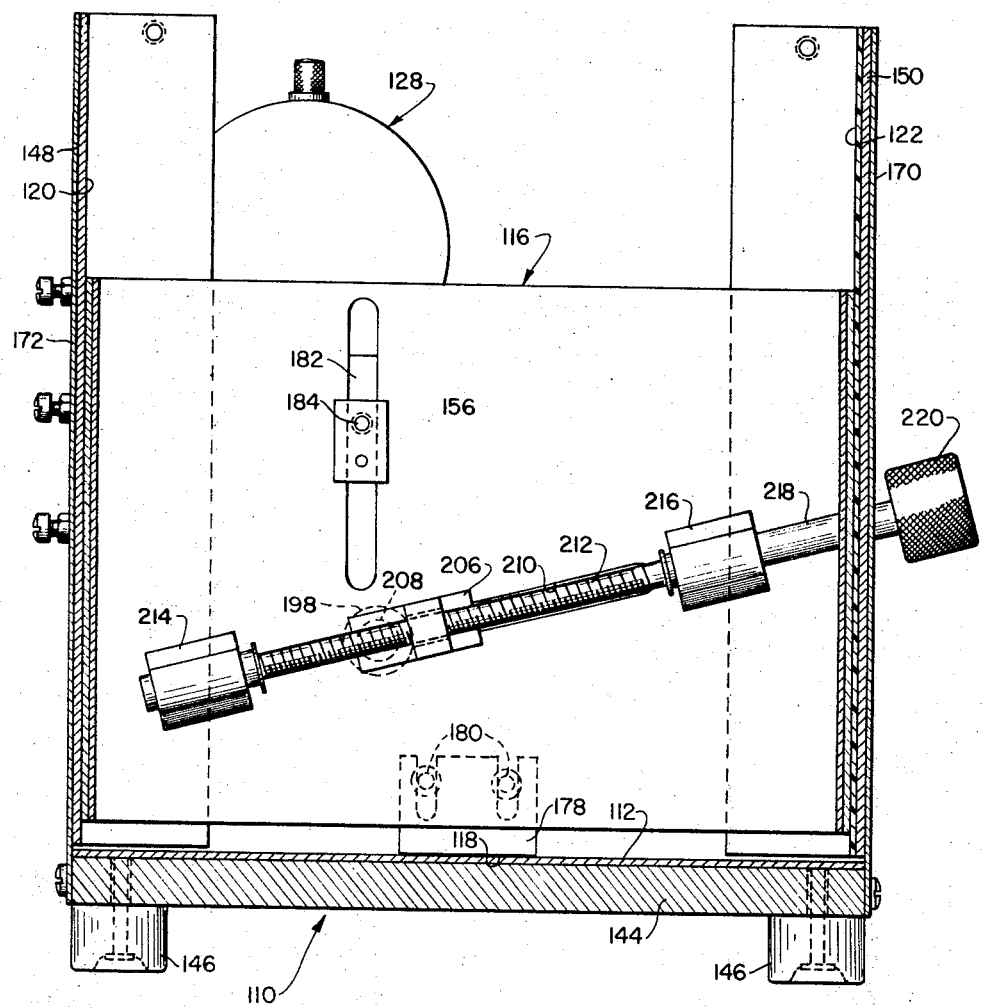
FIGURE 5 is a transverse sectional view taken substantially along the line 5—5 of FIGURE 4.

Referring now in detail to the drawings and particularly to FIGURE 1, the apparatus of the present invention essentially comprises a base 10 having a planar surface 12 upon which a stack of documents 14 to be counted may be placed, a member 16 having a planar surface 18 parallel to the surface 12 and mounted for movement between guideways 20 and 22 for rectilinear movement toward and from the surface 12. Member 16 is resiliently biased toward surface 12 by springs 24 and 26. A uniformly graduated dial indicator 28 having a pivoted pointer 30 coacting with a graduated scale 32 is mounted upon the member 16 and has a reciprocable input element 34 movable along an axis parallel to the path of motion of the member 16 between the guideways 20 and 22, that is perpendicular to the surface 12. The input element 34 of dial indicator 28 is actuated in response to motion of member 16 toward and from surface 12 by a lever 36 pivotally mounted on the base 10 about the axis A which is parallel to the surface 12 and perpendicular to the path of motion of the member 16. Lever 36 is connected to the member 16 by a cam and cam follower connection formed by a slot in lever 36 providing a cam surface 38 and by a cam follower pin 40 mounted on the member 16. The lever 36 is connected to the input element 34 of the dial indicator 28 by the engagement of the planar surface 42 on lever 36 with the bottom tip of the input element 34. The pivot axis A and the axis B of the cam follower 40 are parallel and both lie in the plane of the planar surface 42. The cam surface 38 is planar, parallel to the surface 42 and spaced from the surface 42 a distance equal to the radius of the cam follower 40.

In operation, assuming that with the surface 18 in engagement with the surface 12, the axis B of pin 40 was at point B1 and the point of contact between input element 34 and the surface 42 was at point C1, if, with the stack of documents 14 embraced between the surfaces 18 and 12, the member 16 is moved to raise the axis B of the pin 40 to the point B2, the point of contact between the indicator input element 34 and the surface 42 will have been raised to the point C2. The absolute upward motion of the point C will have been from point C1 to point C2 but the motion of the point C relative to the member 16 on which the indicator 28 is mounted will merely be the distance between the points C2 and C3. As is apparent, the triangles A, B1, B2, and B2, C3, C2 are similar so that the motion of the indicator input element 34 actuating the indicator 28 as represented by the lines C2–C3 is equal to the upward motion of the member 16 as represented by the line B1–B2 times the ratio of the distance B2–C2 to the distance A–B2, which ratio will remain substantially constant throughout the operating range of movement of the member 16.

Calibration of the apparatus of FIGURE 1 to accommodate documents of various thicknesses is effected by shifting the axis B of the cam follower pin 40 laterally of the member 16 to thereby vary the ratio of the distance A–B to the distance B–C while maintaining the points A, B, and C co-planar. For example, referring to FIGURE 2, with the axis B of the pin 40 initially at the point B3 rather than the point B1, a vertical lift of the member 16 equal to the distance B3–B4 will produce the same angle of pivotal motion of the lever 36 as would vertical motion of the member 16 through a distance equal to B1–B2 if the axis of pin 40 were initially at the point B1. In both instances, the point of contact C of the input element 34 of the dial 28 with the surface 42 on the lever 36 would be initially at C1 and finally at C2 but, in the first instance the vertical actuating motion imparted to the input element 34 would be equal to the distance C2–C4 whereas in the latter instance it would only be equal to C2–C3.

The ratio of the distance B–C to the distance A–B is adjusted so that the displacement of the indicator input element 34 relative to the member 16 will be the same when a single document is placed between the surfaces 12 and 18 regardless of its thickness. For example, if one hundredths of an inch vertical displacement of the input element 34 produces an indication of one on the indicator 28 and the thickness of the sheets to be measured is one hundredths of an inch, the ratio B–C to A–B will be one to one. If it is desired to count documents having a thickness of two hundredths of an inch, the ratio of B–C to A–B must be adjusted to one to two so that doubling the thickness of the document will not produce any greater displacement of the pointer 30 of the indicator 28.

The preferred form of the invention as illustrated in FIGURES 3–6 wherein the components corresponding to the elements illustrated and described in reference to FIGURE 1 have been assigned reference numerals 100 higher. The function of the two units are substantially identical. As is apparent from FIGURES 3 and 5, the base assembly 110 provides planar surface 112 upon which the stack of documents to be counted is placed. The base 110 comprises a rigid base plate 144 supported by rubber feet 146 and having upwardly extending channel shaped guide members 148 and 150 rigidly secured thereto and providing the guiding surfaces 120 and 122 defining the vertical path of movement of the member 116.

The member 116 is of hollow construction, open at top and bottom and being defined by a pair of interfitting rigid channel shaped plates 154 and 156 as is best illustrated in FIGURE 4. The side flanges of members 154 and 156 are rigidly interconnected as by riveting or spot welding. The member 116, thus formed, is rigidly confined by and guided by the guide surfaces 120 and 122 for movement in a path perpendicular to the surface 112.

Figure 6:
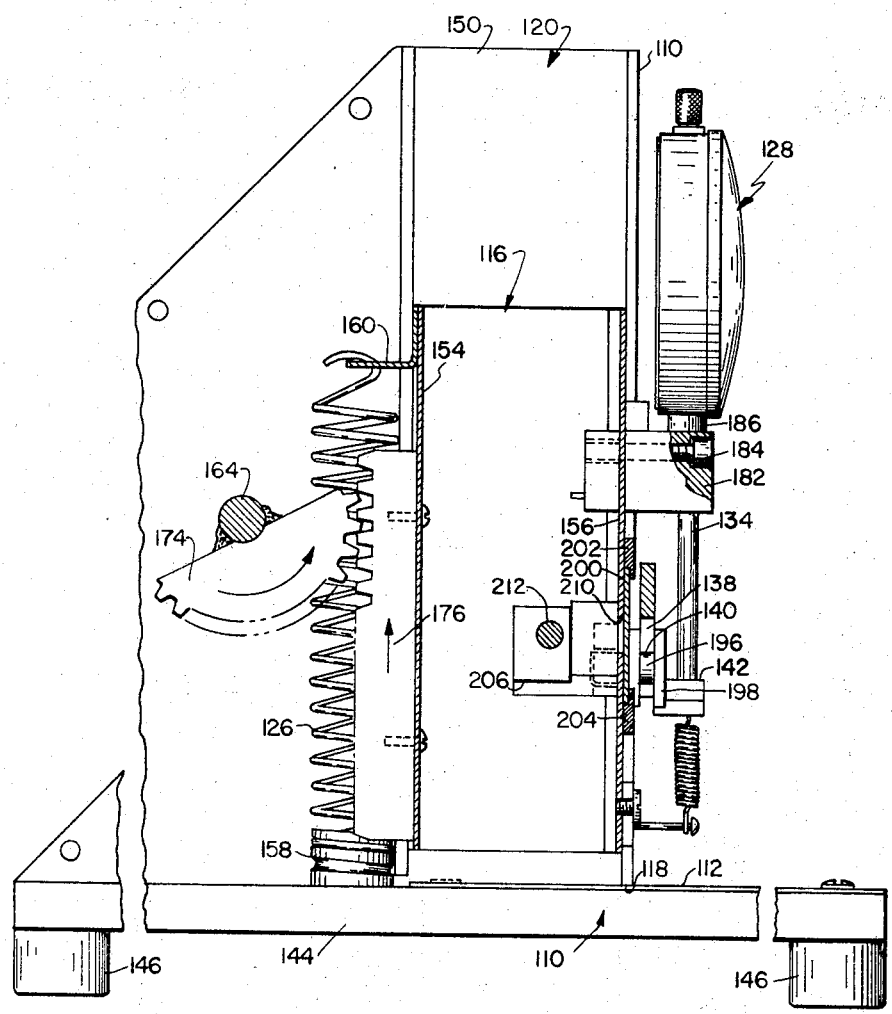
FIGURE 6 is a fragmentary sectional view taken substantially along the line 6—6 of FIGURE 4.

As is best shown in FIGURES 4 and 6, member 116 is resiliently biased toward plate 144 by a pair of tension springs 124 and 126 secured at their lower ends through studs 158 to the plate 144 and through bracket 160 fixed to member 154 adjacent the top of the member 116. The member 116 may be selectively lifted in opposition to the biasing force of the springs 124 and 126 by pushing upon the handle 162 (FIGURE 3). Handle 162 is an integral right angle extension of a shaft 164 journalled in bearings 166 and 168 which are supported by the side plates 170 and 172 respectively of the base 110. A gear segment 174 is fixed to shaft 164 midway between the bearings 166 and 168 and, as is best shown in FIGURE 6, engages a rack 176 fixed to the rear surface of the channel shaped member 154 of the member 116. By this construction, pushing the handle 162 to the rear will pivot shaft 164 in a counterclockwise direction as viewed in FIGURE 6 to lift the member 116 relative to the base 110 to disengage the surface 118 from the surface 112 to permit insertion of a stack of documents to be counted therebetween. After the documents have been inserted between the surfaces 118 and 112, the handle is released so that the stack of documents is firmly embraced between the surfaces 112 and 118 under the biasing force determined by the springs 124 and 126.

As is best shown in FIGURES 3 and 5, the surface 118 is provided on a block 178 fixed by screws 180 in a selectively adjustable position at the bottom of the channel shaped member 156 of the member 116.

The indicator 128 is mounted on the front channel member 156 by a mounting bracket 182 fixed thereto by screws 184. The bracket 182 rigidly clamps the depending cylindrical portion 186 of the housing of the indicator 128 while the vertically reciprocable stem or input member 134 extends freely through the bracket 182. The bracket 182 mounts the indicator 128 so that the axis of reciprocation of its input element 134 is perpendicular to the surface 112, that is parallel to the path of motion of the member 116 relative to the base 110 as defined by the guideways 122 and 120.

The lever 136 is pivotally mounted about the axis A upon stud 188 fixed to the channel member 150 of the base 110. The cam surface 138 of the lever 136 rests upon the cylindrical periphery of the cam follower 140 and has a laterally projecting extension 190 providing the surface 142 engaging the input element 134 of the indicator 128 and to which is attached a tension spring 192. The spring 192 is attached to its opposite end with spring stud 194 mounted on the channel member 156. Spring 192 biases the lever 134 in a clockwise direction about the axis A against the periphery of the cam follower 140.

As is most clearly apparent from FIGURE 6, the cam follower 140 is formed by the base wall of an annular groove 196 in a cylindrical boss 198 attached to a plate 200 mounted for sliding motion over the base wall of the channel shaped member 156 between a pair of inclined guideways 202 and 204. The boss 198 and plate 200 are secured to a block 206 disposed on the opposite face of the base wall of the channel shaped member 156 by a screw 208 (best seen in FIGURE 3).

As is most clearly apparent from FIGURE 5, the screw 208 projects through an elongated slot 210 in the base wall of the channel shaped member 156 and the position of the block 206 and the member 200 and boss 198 fixed thereto by the screw 208 along the length of the slot 210 is controlled by an elongated screw 212 which is threadedly engaged through an internally threaded aperture in the block 206 and journalled by spaced bearings 214 and 216 on the internal surface of the base wall of the channel shaped member 156. The screw 212 has an elongated extension 218 projecting through an aligned aperture in the side wall of the member 116 and an elongated aperture through the channel shaped member 150 and side plate 170 and terminating in a knob 220 by which it may be rotated. When the member 116 is in its home position as shown in FIGURES 3-6, with the surface 118 in engagement with the surface 112 the axis of screw 112 lies in the plane defined by the pivot axis A, the axis B of the cam follower 140 and the surface 142 so that the axis B of the cam follower 140 may be shifted along the axis of the screw 12 to vary the ratio of the distance B-C to the distance A-B without displacing the axis B from the plane defined by the surface 142 and the axis A. As so constructed, with the member 116 in its home position, the indicator pointer 130 will remain at zero throughout the entire range of adjustment of cam follower 140 along the axis of screw 212 to accommodate different thicknesses of individual documents.

In operation, to calibrate the instrument it is merely necessary to place a given number of documents between the surface 112 and 118 and then adjust the knob 220 until the pointer 130 of the indicator 128 indicates the known number of documents between the surfaces 112 and 118. Once this adjustment is made, the instrument is ready to measure any number of like documents. In dealing with documents formed of porous paper, there is a tendency to trap air which can produce inaccurate readings. This can be overcome in the present device by exerting a slight forward pressure on the handle 162 to supplement the biasing force of the springs 124 and 126 to firmly seat the surface 118 of the member 178 against the top of the stack to be counted and press any entrapped air from between the sheets of the stack to be counted. For best accuracy in dealing with non-porous sheets, it has been found that it is best not to exert this supplemental force but to rely merely upon the known force of the springs 124 and 126.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A device for counting in bulk the number of substantially uniformly thick sheetlike items in a stack of such items comprising a base, a measuring member having a planar surface adapted to engage a stack of such items disposed against said base on the side thereof opposite the base, means mounting said measuring member for movement in a rectilinear path relative to said base and normal to said planar surface, whereby the displacement of said member is equal to the thickness of said stack, a lever, means pivotally mounting said lever on said base for swinging movement about an axis extending perpendicular to said path of rectilinear motion, motion transmitting means so connecting said lever to said measuring member that said lever is displaced by and relative to the measuring member a distance proportional to the distance the member is displaced relative to the base by the stack of sheets being counted, an indicator having an input member mounted for rectilinear motion along a path that is parallel to the path of movement of said measuring member, said input member being operatively connected to said lever and operably displaceable thereby through a distance proportional to the displacement of the measuring member and therefore proportional to the thickness of the stack of items being counted and means for converting the displacement of said input member to an indication of the number of items in said stack, said lever having a planar surface lying in a plane containing its pivot axis and engaging said input member to transmit the lever motion to said input member, said motion transmitting means comprising a cylindrical boss member having an annular, outwardly-opening groove and being mounted on said measuring member with the longitudinal axis of said boss member extending parallel to the pivot axis of said lever, and means forming a slot in said lever to provide a straight, elongated edge extending parallel to said planar surface of said lever and perpendicular to the axis of said boss member, said edge being seated on the bottom surface of said annular groove and cooperating therewith to operatively provide a cam and cam follower connection for transmitting the motion of said measuring member to said lever, and calibrating means for selectively altering the ratio between the displacement of the indicator input member and the displacement of said measuring member to enable said indicator to correctly indicate the number of items in stacks containing items of different thicknesses, said calibrating means comprising at least one guideway on said measuring member, a structure supporting said boss member and being slidable along said guideway toward and away from the pivot axis of said lever member, and an elongated screw member journalled on said measuring member for rotation about an axis lying in a plane containing said planar surface of said lever, said screw member being threadedly engaged with said structure and being selectively rotatable for shifting the assembly of said structure and said boss member along the screw member axis to vary the ratio of the distance between the boss member axis and the lever pivot axis to the distance between boss member axis and the axis along which said indicator input member is rectilinearly movable.

2. The device defined in claim 1 wherein said indicator is mounted on said measuring member for movement therewith.

3. The device defined in claim 2 comprising means resiliently biasing said measuring member toward said base and selectively actuatable means for separating said member from said base to permit insertion of a stack of items to be counted between said base and said planar surface of said measuring member.

References Cited
UNITED STATES PATENTS

| | | | |
|---|---|---|---|
| 491,800 | 2/1893 | Farnham | 33—147 |
| 1,369,120 | 2/1921 | Mergenthaler | 33—147 |
| 2,112,252 | 3/1938 | Sang | 33—147 |

LEONARD FORMAN, *Primary Examiner.*

J. M. FREED, *Assistant Examiner.*